D. M. KIRKBRIDE,

Assignor to W. YOUNG.

Plashed Hedges.

No. 9,415. Reissued Oct. 12, 1880.

*Attest:*
W. H. H. Knight,
Fred F. Church

*Inventor:*
David M. Kirkbride
By Hill & Church,
His attys.

THE NORRIS PETERS CO., PHOTO-LITHO., WASHINGTON, D. C.

UNITED STATES PATENT OFFICE.

DAVID M. KIRKBRIDE, OF DAYTON, ASSIGNOR TO WESLEY YOUNG, OF COLUMBUS, OHIO.

PLASHED HEDGE.

SPECIFICATION forming part of Reissued Letters Patent No. 9,415, dated October 12, 1880.

Original No. 178,161, dated May 30, 1876. Application for reissue filed August 28, 1880.

*To all whom it may concern:*

Be it known that I, DAVID M. KIRKBRIDE, of Dayton, in the county of Montgomery and State of Ohio, formerly of Bloomington, McLean county, State of Illinois, have invented a new and useful Improvement in Plashed Hedges; and I do hereby declare the following to be a full and exact description of the same, reference being had to the accompanying drawings, forming a part of this specification, in which—

Figure 1:
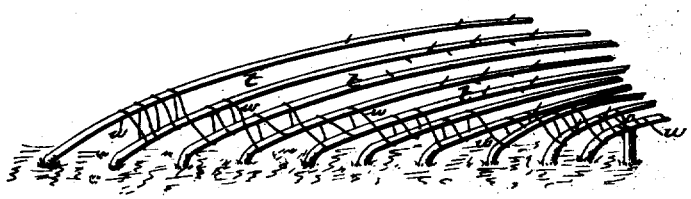
Figure 2:
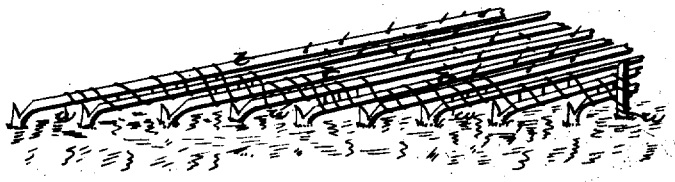

Figures 1 and 2 represent different modifications of my improved hedge.

In plashing hedges heretofore it has been the practice to bend the tops or upper ends of the growing twigs or hedge-canes in the plane of the fence to be produced, and secure them permanently in that position by fastenings applied to or near the upper ends of the twigs. Three different modes of applying such fastenings have been resorted to, to wit: first, by interweaving or intertwining the extreme upper ends of the twigs themselves; secondly, by interweaving with the extreme upper ends of the twigs rods or twigs arranged in a horizontal position; and, thirdly, by bending the extreme upper ends of the twigs to the ground and securing them thereto by means of weights. In practicing the last-mentioned mode of fastening down the ends of the twigs they have sometimes been notched or cut near the ground on the same side with the weights, in order to make them bend more readily. These various practices have always proved disadvantageous and defective to such an extent as to greatly interfere with their practical application. The main difficulty has been that in bending them and fastening them at or near their tops the bodies of the twigs are caused to assume curved or bowed shapes, frequently with wide open spaces between them, and are entirely unsupported and disconnected near the ground, thus affording small animals an easy opportunity to press through them and disarrange or destroy them.

The work cannot be done with uniformity nor so as to give the hedge a close and tight base while any considerable portion of the lower parts of the twigs or canes remains in an upright position, and the fastenings thus formed are not sufficiently substantial nor durable, for the reason that the tops of the canes and the branches used soon decay.

When the ends of the twigs are bent down to the ground and fastened by weights the further difficulty arises that the sap is obliged to flow from the upper portion of the bent twig downward to reach the extreme end, and as such downward movement is unnatural the sap is forced into the shoots or sprouts nearest to the base of the plant, and the downwardly-inclined ends wither and die. With the last-mentioned mode of plashing, the twigs or canes tend to throw out extra strong shoots below the point at which the hacking or cutting is done, and then eventually absorb the whole of the sap and cause all that part of the canes which is bent down to die and decay.

Hedges plashed by any of the above-mentioned modes lack uniformity of structure, grow unevenly, are ragged in appearance, and are very liable to accidental injury by breaking of the fastenings or displacements of the twigs.

To produce the very best results in plashing hedges I have discovered that the bodies of the twigs should be inclined to the proper extent and held as nearly straight and parallel to each other as possible, which cannot be effected by any known mode of applying fastenings to the tops of the twigs, and I have demonstrated by practical experiment that the best mode of securing the twigs in such position is to apply near the bottom of the hedge, but above the lower ends of the twigs, strong flexible fastenings not a part of the growing hedge, whereby each twig will be fastened at a point near the ground to a higher part of the overlapping twig or twigs, so that the upward strain of the fastenings upon the twigs shall come at a point as near as possible to the bend or angle of the cane, while the downward strain, which holds them in position, shall come at a point farther from the bend, but so as to leave the body and upper end of the twig free and unbent, although inclined upward, in which position it will grow naturally and send out its shoots regularly, by the straight upright growth of which shoots a strong, uniform, and beautiful hedge will be produced. My invention therefore consists in bending the twigs or canes at or near the surface of the ground so that their bodies will lie inclined and substantially parallel to each other one over another, and in fastening to the lower portion of each cane a higher portion of the cane or canes above by means of wire or other flexible material not a part of the growing hedge.

In the drawings two different forms of hedge are represented—one in Fig. 1, in which the twigs or canes *t*, having been suitably trimmed, are bent down and secured together by wire applied near their lower ends in the manner above referred to, and another in Fig. 2, in which they are cut or broken slightly on one side, leaned down on the opposite side, and secured together by a wire in the manner above stated.

I am aware that hedges have been formed of willow stakes driven in a position somewhat inclined, with the tops bound together by the interweaving of some binding material not a part of the fence, and that the stakes, after being driven, often grow and form a living hedge. I wish, therefore, to be understood as not claiming, broadly, any such inclined fence; nor do I claim a fence having the twigs interwoven; nor a fence having only fastenings of any kind applied at or near the upper ends of the twigs or canes; nor a fence having the tops of the twigs bent down upon the ground and secured by weights placed thereon, these modes being all substantially different from mine and productive of different and inferior results.

The wire connections which are used serve the double purpose of holding the canes securely in position, strengthening the fence, and rendering it impenetrable to small animals.

I claim as my invention—

1. The mode of plashing hedges herein described, consisting, essentially, in bending the twigs at or near the surface of the ground in line with the plane of the fence, and securing the higher portion of one twig or cane to the lower portion of another twig or cane by means of wire or other flexible fastenings not a part of the growing hedge, substantially as described.

2. The hedge fence herein described, consisting, essentially, of the growing twigs or canes bent over at or near the surface of the ground in line with the plane of the fence, and having the higher portion of one twig or cane secured to the lower portion of another twig or cane by means of wire or other flexible material not a part of the growing hedge.

DAVID M. KIRKBRIDE.

Witnesses:
MICHL. NEIL,
CHAS. M. WETZEL.